US006484377B1

(12) United States Patent
Rockstad et al.

(10) Patent No.: US 6,484,377 B1
(45) Date of Patent: Nov. 26, 2002

(54) HANGER SUPPORT INSTALLATION TOOL

(75) Inventors: Ross E. Rockstad, Hobart, WA (US); Paul N. Stavig, Jr., Puyallup, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/911,254

(22) Filed: Jul. 23, 2001

(51) Int. Cl.[7] .............................................. B23P 19/04
(52) U.S. Cl. ...................................................... 29/267
(58) Field of Search ................................ 254/250, 251, 254/30, 24; 29/267

(56) References Cited

U.S. PATENT DOCUMENTS 1,057,534 A * 4/1913 Ethridge ..................... 254/251
4,671,493 A 6/1987 Ravencroft
4,688,607 A 8/1987 Wolcott
4,998,312 A 3/1991 Donaldson
5,152,490 A 10/1992 Deutsch
5,352,078 A 10/1994 Nasu
5,372,166 A 12/1994 Lai
5,632,312 A 5/1997 Hoffman

* cited by examiner

*Primary Examiner*—Robert C. Watson
(74) *Attorney, Agent, or Firm*—Harness Dickey & Pierce P.L.C.

(57) ABSTRACT

An installation tool for installing a support hanger in an aircraft, where the support hanger includes a main hook body and a complimentary hook body slidably coupled with the main hook body. The support hanger further includes a locking mechanism for selectively locking the main hook body and the complimentary hook body. The installation tool comprises a handle having a pivot surface that engages the main hook body of the support hanger. A wedge-shaped slot is formed in the handle and includes a pair of surfaces. An interfering member is then disposed within the wedge-shaped slot. This interfering member is positionable in a first position where the interfering member engages at least one of the pair of surfaces and a free end of the complimentary hook body and a second position where the interfering member is disengaged from the pair of surfaces so as to permit simple and convenient tightening of the support hanger.

9 Claims, 2 Drawing Sheets

HANGER SUPPORT INSTALLATION TOOL

FIELD OF THE INVENTION

The present invention generally relates to aircraft support hangers and, more particularly, relates to a support hanger installation tool for use with BACS 38P aircraft support hangers.

BACKGROUND OF THE INVENTION

BACS 38P Support Hangers are often used in aircraft manufacturing to fasten or otherwise secure items to the interior of the aircraft. Specifically, the BACS 38P Support Hangers are typically two-piece plastic nut-plates that attach to the hat-section fuselage stringers. An example of a BACS 38P Support Hanger is illustrated in FIG. 1 in conjunction with the installation tool of the present invention.

Referring to FIG. 1, these conventional support hangers each include a main body portion having a primary hook member extending from an end thereof. This primary hook member engages a portion of the fuselage stringer of the aircraft. The main body portion includes an internal slot having a molded-in locking feature. This molded-in locking feature cooperates with a slidable tape member to lockingly engage the support hanger and the fuselage stringer. The slidable tape member includes a complimentary hook member opposingly positioned relative to the primary hook member of the main body portion, which is used to engage the opposite side of the fuselage stringer to retain the hanger support. The support hanger still further includes a support feature, such as but not limited to a nut, a protrusion, and the like, for attaching the item to be secured.

To effect a locking engagement of the hanger support to the fuselage stringer, the molded-in locking feature of the main body portion engages a ribbed or serrated portion of the slidable tape member. The slidable tape member is pulled through the internal slot of the main body portion until the appropriate amount of retaining force is achieved.

These hanger supports are traditionally manually installed by a workman during the assembly of the aircraft or when retrofits or repairs are necessary. To this end, the slidable tape member is inserted into the internal slot of the main body portion such that the primary and complimentary hook members are generally in a mirrored position. The opposing end of the slidable tape member that is exiting from the internal slot (a.k.a. the tongue portion) is pulled relative to the main body portion to tighten the grip of the support hanger to the fuselage stringer. Typically, this is accomplished using a pair of pliers or freely with the hand. As can be appreciated, hand installation can be fatiguing and may lead to repetitive motion stress. Alternatively, installation using pliers often slips or may similarly lead to repetitive motion stress due to the constant gripping of the pliers.

Accordingly, there exists a need in the relevant art to provide an installation tool capable of effectively and conveniently apply a gripping and tightening force to the tongue of a slidable tape member of a support hanger. Still further, there exists a need in the relevant art to provide an installation tool capable of overcoming the disadvantages of the prior art.

SUMMARY OF THE INVENTION

According to the principles of the present invention, an installation tool for installing a support hanger in an aircraft, where the support hanger includes a main hook body and a complimentary hook body slidably coupled with the main hook body, is provided. The support hanger includes a locking mechanism for selectively locking the main hook body and the complimentary hook body. The installation tool comprises a handle having a pivot surface that engages the main hook body of the support hanger. A wedge-shaped slot is formed in the handle and includes a pair of surfaces. An interfering member is then disposed within the wedge-shaped slot and is positionable in a first position where the interfering member engages at least one of the pair of surfaces and a free end of the complimentary hook body and a second position where the interfering member is disengaged from the pair of surfaces so as to permit simple and convenient tightening of the support hanger.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses. For example, the installation tool according to the principles of the present invention may find utility in a wide range of fastening applications.

Figure 1:
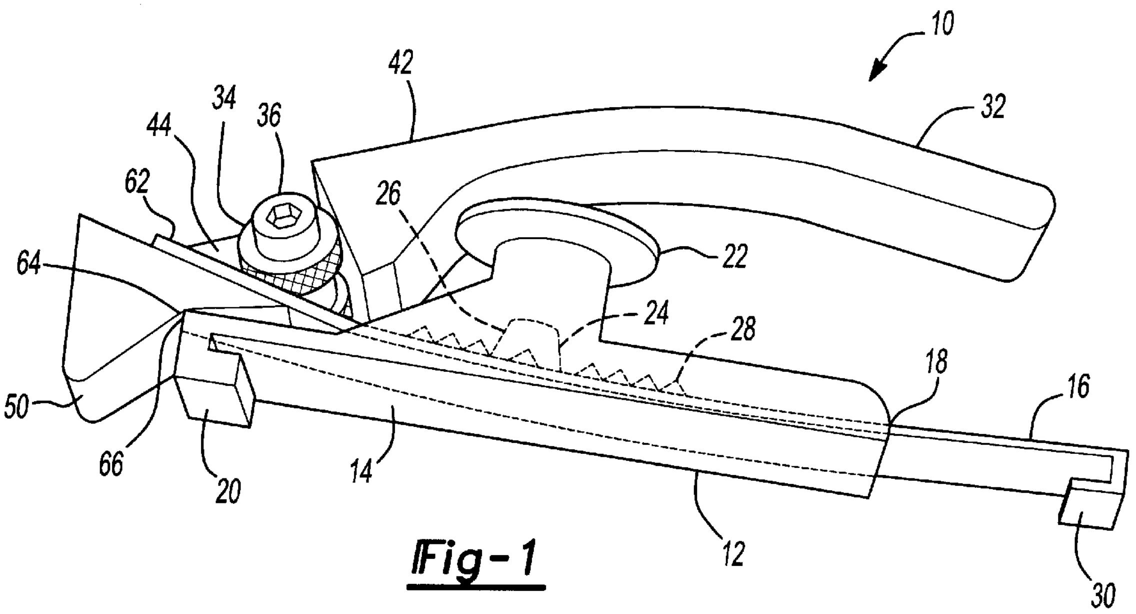
FIG. 1 is a perspective view illustrating an installation tool according to the principles of the present invention in a mating engagement with a conventional BACS 38P Support Hanger.

Referring to FIG. 1, a BACS 38P hanger support installation tool 10 is illustrated in a mating engagement with a conventional BACS 38P hanger support 12. Hanger support 12 is particularly adapted for use in an aircraft (not shown) and, more particularly, adapted to lockingly engage a fuselage stringer (not shown) in an aircraft. Hanger support 12 includes a main body portion 14 and a tape member 16 slidably disposed within an internal slot 18 of main body portion 14. Main body portion 14 includes a primary hook member 20 extending from an end thereof. Primary hook member 20 is adapted to engage a flange or other feature extending from the fuselage stringer. Main body portion 14 further includes an attachment member 22 extending therefrom for fastening various interior items thereto, such as wiring bundles, plumbing, or hydraulic lines. However, it should be understood that attachment member 22 may be of any shape or include any fasteners that are conducive to aircraft assembly.

Hanger support 12 further includes a molded-in locking system 24. Molded-in locking system 24 includes a ratcheting section 26, typically disposed in main body portion 14, and a serrated section 28, typically disposed along tape member 16. Serrated section 28 engages ratcheting section 26 to effect a locking relationship.

Tape member 16 further includes a complimentary hook member 30 extending from an end thereof. Complimentary hook member 30 is adapted to engage an opposing flange or other feature extending from the fuselage stringer opposite primary hook member 20.

Hence, during installation, tape member 16 is slidably inserted into internal slot 18 of main body portion 14 such that serrated section 28 engages ratcheting section 26 to effect a locking relationship within molded-in locking system 24. Primary hook member 20 and complimentary hook member 30 may be opposingly engaged with the fuselage stringer. Hanger support 12 is then tightened and locked about the fuselage stringer using installation tool 10.

Figure 2:
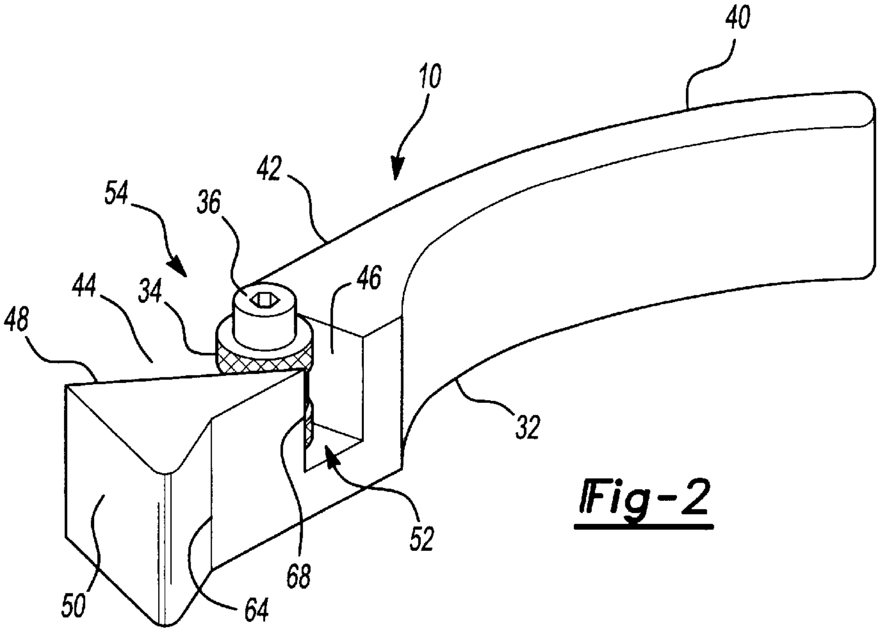
FIG. 2 is a perspective view illustrating the installation tool according to the principles of the present invention.
Figure 3:
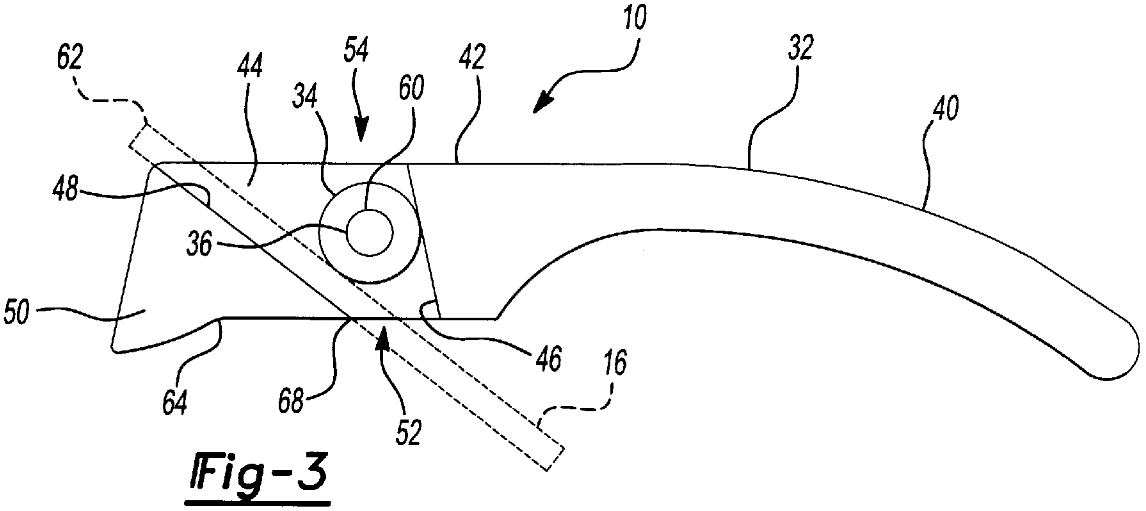
FIG. 3 is a plan view illustrating the installation tool according to the principles of the present invention.
Figure 4:
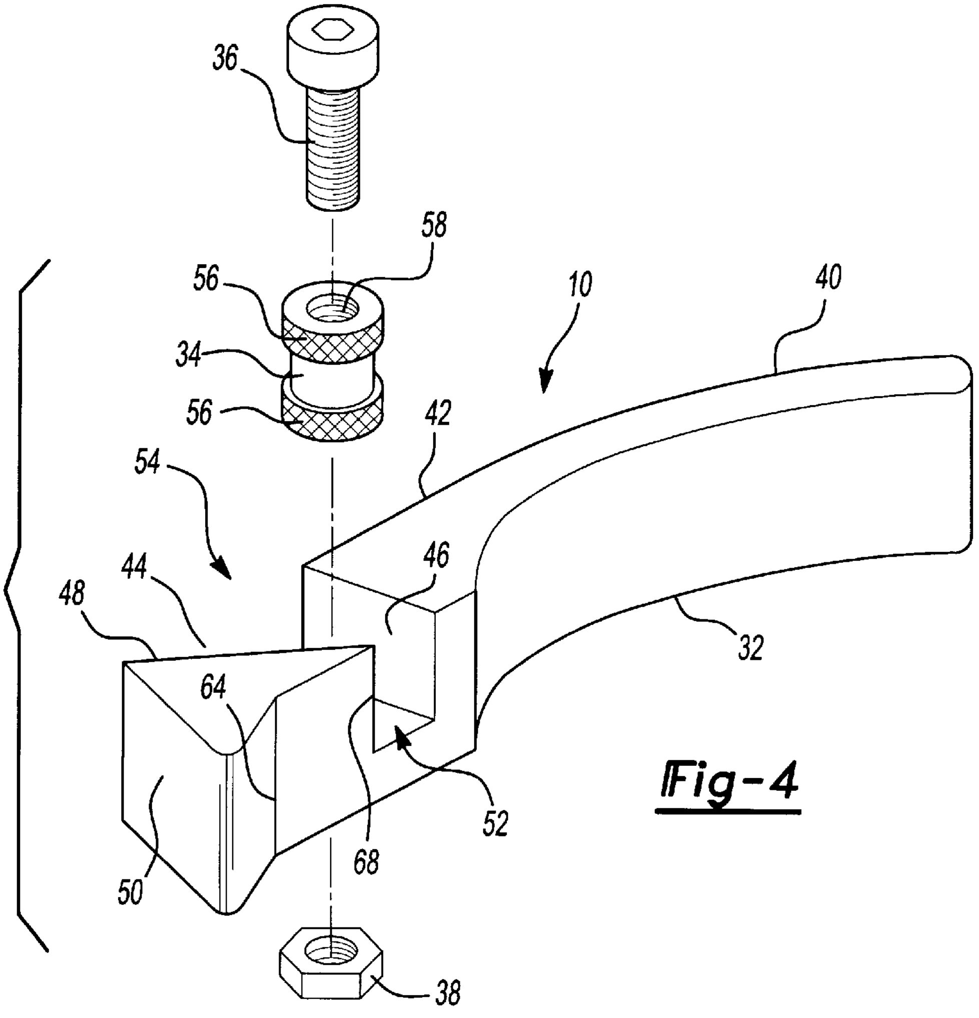
FIG. 4 is an exploded perspective view illustrating the installation tool according to the principles of the present invention.

As best seen in FIGS. 2–4, installation tool 10 includes an adjusting lever 32, a free-floating bushing 34, a fastener 36, and a nut 38. Adjusting lever 32 is generally an elongated member having an arcuate handle 40 preferably integrally formed with an enlarged head 42. Enlarged head 42 includes a generally wedge-shaped slot 44 formed along a side thereof. As best seen in FIG. 3, wedge-shaped slot 44 is defined by a proximal inclined surface 46 and a distal inclined surface 48. Enlarged head 42 terminates in a downwardly extending nose 50 defining an edge 64.

Still referring to FIGS. 2–4, proximal surface 46 and distal surface 48 each extend to the edges of enlarged head 42 so as to form an inlet opening 52 and an outlet opening 54 in wedge-shaped slot 44.

As best seen in FIG. 4, free-floating bushing 34 is a hardened steel bushing preferably having a 0.406" outer diameter. Bushing 34 is generally cylindrical in shape and includes a knurled exterior portion 56 and a central bore 58.

Wedge-shaped slot 44 of enlarged head 42 further includes a bore 60 extending therethrough, which is sized to receive fastener 36. Thus, during assembly of installation tool 10, fastener 36 extends through central bore 58 of free-floating bushing 34 and through bore 60 of enlarged head 42. Nut 38 is then inserted onto the end of fastener 36 to complete the assembly of installation tool 10. It should be appreciated that central bore 58 of free-floating bushing 34 is preferably larger than the outer diameter of fastener 36 such that free-floating bushing 34 is permitted to move relative to fastener 36.

During installation of hanger support 12 to the fuselage stringer, tape member 16 is slidably inserted into internal slot 18 of main body portion 14 of hanger support 12 such that serrated section 28 engages ratcheting section 26 to effect a locking relationship within molded-in locking system 24. Primary hook member 20 and complimentary hook member 30 are then opposingly engaged with the fuselage stringer. Hanger support 12 is then tightened and locked about the fuselage stringer in accordance with the following operation.

Installation tool 10 is positioned generally adjacent to hanger support 12 such that a free end 62 of tape member 16 is positioned between free-floating bushing 34 and distal inclined surface 48 (as illustrated in FIG. 1). Edge 64, formed along the underside of nose 50, engages a backside 66 of primary hook member 20 of hanger support 12. Simultaneously, knurled exterior portion 56 of free-floating bushing 34 is pushed against free end 62 of tape member 16 and proximal surface 46. As a result, bushing 34 locks up against tape member 16 and installation tool 10, thereby locking tape member 16 against distal surface 48 to prevent relative movement therebetween. In particular, an edge 68, which is formed on distal surface 48 within inlet opening 52, grabs a backside of free end 62 of tape member 16 to hold tape member 16 relative to installation tool 10. A worker then lifts adjusting lever 32 away from hanger support 12 such that installation tool 10 pivots about edge 64 and applies a downward force at edge 64 to hanger support 12, which maintains hanger support 12 in the proper position, while free end 62 of tape member 16 is pulled tighter as installation tool 10 pivots about nose 50.

This pivoting movement of installation tool 10 continues until a predetermined amount of tension is produced between main body portion 14 of hanger support 12 and tape member 16. During this time, molded-in locking system 24 progressively establishes a locking engagement between ratcheting section 26 and serrated section 28. Molded-in locking system 24 maintains this proper tension and securing force even after installation tool 10 is pivoted back and removed. If needed, installation tool 10 may be pivoted back to an initial position if further tightening is required. In particular, as installation tool 10 is pivoted back, bushing 34 releases from engagement between free end 62 and proximal surface 46 to permit relative movement between installation tool 10 and tape member 16.

With particular reference to FIGS. 1 and 3, it is important to note that proximal surface 46 and distal surface 48 of wedge shaped slot 44 cooperate with knurled exterior portion 56 of bushing 34 to create a wedging and binding effect to retain tape member 16 during tightening. This is accomplished due to the diverging slope of proximal surface 46 and distal surface 48 from outlet opening 54 to inlet opening 52. This diverging slope aids to lock up bushing 34 during a tightening motion.

Accordingly, the installation tool of the present invention provides a device capable of effectively and conveniently apply a gripping and tightening force to the tongue of a slidable tape member of a support hanger. Still further, there exists a need in the relevant art to provide an installation tool capable of overcoming the disadvantages of the prior art.

The description of the invention is merely exemplary in nature and, thus, variations are not to be regarded as a departure from the spirit and scope of the invention.

What is claimed is:

1. An installation tool for installing a support hanger in an aircraft, said support hanger having a main hook body and a complimentary hook body slidably coupled with said main hook body, said support hanger further having a locking mechanism for selectively locking said main hook body and said complimentary hook body, said installation tool comprising:

- a handle having a pivot surface engageable with the main hook body of the support hanger;
- a wedge-shaped slot formed in said handle, said wedge-shaped slot having a pair of surfaces;
- an interfering member disposed within said wedge-shaped slot, said interfering member being positionable in a first position where said interfering member engages at least one of said pair of surfaces and a free end of the complimentary hook body and a second position where said interfering member is disengaged from said pair of surfaces, said interfering member is a bushing member having a knurled exterior surface and a central bore; and
- a fastener having an outside diameter, said fastener coupling said bushing member to said handle, said outside diameter of said fastener being sufficiently sized to permit said bushing member to move relative to said fastener between said first position and said second position.

2. The installation tool according to claim 1 wherein said pair of surfaces of said wedge-shaped slot is a proximal surface and a distal surface, said proximal surface selectively engaging said interfering member, said distal surface selectively engageable with said free end of the complimentary hook body.

3. An installation tool for installing a support hanger in an aircraft, said support hanger having a main hook body and a complimentary hook body slidably coupled with said main hook body, said support hanger further having a locking mechanism for selectively locking said main hook body and said complimentary hook body, said installation tool comprising:

a handle having a pivot surface engageable with the main hook body of the support hanger;

a wedge-shaped slot formed in said handle, said wedge-shaped slot having a proximal surface and a distal surface;

a knurled bushing disposed within said wedge-shaped slot, said knurled bushing being positionable in a first position where said knurled bushing engages at least one of said pair of surfaces and a free end of the complimentary hook body and a second position where said knurled bushing is disengaged from said pair of surfaces, wherein said proximal surface of said wedge-shaped slot selectively engages said interfering member, said distal surface of said wedge-shaped slot selectively engageable with said free end of the complimentary hook body; and a fastener having an outside diameter, said fastener coupling said knurled bushing to said handle, said outside diameter of said fastener being sufficiently sized to permit said knurled bushing to move relative to said fastener between said first position and said second position.

4. The installation tool according to claim 3 wherein said handle is made of aluminum.

5. A kit for use in fastening items to a fuselage stringer in an aircraft, said kit comprising:

a support hanger for supporting the items within the aircraft, said support hanger comprising:

a main hanger body having a first hook;

a complimentary hanger body slidably coupled with said main hanger body, said complimentary hanger body having a second hook and a free end opposite of said second hook;

a locking mechanism for selectively interlocking said main hanger body and said complimentary hanger body; and an installation tool comprising:

a handle having a pivot surface engaging said first hook of said main hanger body;

a wedge-shaped slot formed in said handle, said wedge-shaped slot having a proximal surface and a distal surface, said distal surface selectively engaging said free end of said complimentary hanger body; and a knurled bushing disposed within said wedge-shaped slot, said knurled bushing being positionable in a first position where said knurled bushing engages said proximal surface and said free end of said complimentary hanger body and a second position where said knurled bushing is disengaged from said proximal surface and said free end of said complimentary hanger body.

6. The kit according to claim 5, further comprising a fastener having an outside diameter, said fastener coupling said knurled bushing to said handle, said diameter of said fastener being sufficiently sized to permit said knurled bushing to move relative to said fastener between said first position and said second position.

7. An installation tool for installing a support hanger in an aircraft, said support hanger having a main hook body and a complimentary hook body slidably coupled with said main hook body, said support hanger further having a locking mechanism for selectively locking said main hook body and said complimentary hook body, said installation tool comprising:

a handle having a pivot surface engageable with the main hook body of the support hanger;

a wedge-shaped slot formed in said handle, said wedge-shaped slot having a pair of surfaces;

an interfering member disposed within said wedge-shaped slot, said interfering member being positionable in a first position where said interfering member engages at least one of said pair of surfaces and a free end of the complimentary hook body and a second position where said interfering member is disengaged from said pair of surfaces; and a fastener having an outside diameter, said fastener coupling said bushing member to said handle, said outside diameter of said fastener being sufficiently sized to permit said bushing member to move relative to said fastener between said first position and said second position.

8. The installation tool according to claim 7 wherein said interfering member is a bushing member having a knurled exterior surface and a central bore.

9. The installation tool according to claim 7 wherein said pair of surfaces of said wedge-shaped slot is a proximal surface and a distal surface, said proximal surface selectively engaging said interfering member, said distal surface selectively engageable with said free end of the complimentary hook body.

* * * * *

UNITED STATES PATENT AND TRADEMARK OFFICE
CERTIFICATE OF CORRECTION

PATENT NO. : 6,484,377 B1
DATED : November 26, 2002

INVENTOR(S) : Rockstad et al.

It is certified that error appears in the above-identified patent and that said Letters Patent is hereby corrected as shown below:

Title page,
Item [54], Title, add -- BACS 38P -- before "HANGER"

Column 6,
Line 18, add -- outside -- before "diameter"
Line 39, add -- said interfering member is a bushing member having a knurled exterior surface and a central bore; -- at the end of paragraph before "and"

Signed and Sealed this

Tenth Day of August, 2004

JON W. DUDAS
*Acting Director of the United States Patent and Trademark Office*